United States Patent
Shope et al.

(10) Patent No.: US 9,012,547 B2
(45) Date of Patent: Apr. 21, 2015

(54) HYDROSILYLATION CURED SILICONE RESINS PLASTICIZED BY ORGANOPHOSPHOROUS COMPOUNDS

(75) Inventors: Marilyn P. Shope, Midland, MI (US); Bizhong Zhu, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 44 days.

(21) Appl. No.: 13/820,867

(22) PCT Filed: Oct. 31, 2011

(86) PCT No.: PCT/US2011/058517
§ 371 (c)(1),
(2), (4) Date: Mar. 5, 2013

(87) PCT Pub. No.: WO2012/064534
PCT Pub. Date: May 18, 2012

(65) Prior Publication Data
US 2013/0164517 A1     Jun. 27, 2013

Related U.S. Application Data

(60) Provisional application No. 61/411,536, filed on Nov. 9, 2010.

(51) Int. Cl.

| | | |
|---|---|---|
| *C08L 83/06* | (2006.01) | |
| *C09J 183/06* | (2006.01) | |
| *C08L 83/04* | (2006.01) | |
| *C08K 5/521* | (2006.01) | |
| *C08K 5/523* | (2006.01) | |
| *C09J 183/04* | (2006.01) | |
| *B32B 5/02* | (2006.01) | |
| *B32B 7/12* | (2006.01) | |
| *B32B 27/20* | (2006.01) | |
| *B32B 27/28* | (2006.01) | |
| *C08J 5/24* | (2006.01) | |
| *C08G 77/12* | (2006.01) | |
| *C08K 5/5419* | (2006.01) | |
| *C08K 5/5425* | (2006.01) | |
| *C08G 77/20* | (2006.01) | |

(52) U.S. Cl.
CPC ............... *C08L 83/06* (2013.01); *C09J 183/06* (2013.01); *C08L 83/04* (2013.01); *C08K 5/521* (2013.01); *C08K 5/523* (2013.01); *C08G 77/12* (2013.01); *C08K 5/5419* (2013.01); *C08K 5/5425* (2013.01); *C08G 77/20* (2013.01); *C09J 183/04* (2013.01); *B32B 5/02* (2013.01); *B32B 7/12* (2013.01); *B32B 27/20* (2013.01); *B32B 27/283* (2013.01); *B32B 2260/021* (2013.01); *B32B 2260/046* (2013.01); *B32B 2307/412* (2013.01); *C08J 5/24* (2013.01); *C08J 2383/04* (2013.01)

(58) Field of Classification Search
CPC ............................... C08K 5/521; C08K 5/523
USPC ................... 524/127, 140, 141; 428/447, 448
See application file for complete search history.

(56) References Cited

U.S. PATENT DOCUMENTS

| | | |
|---|---|---|
| 2,684,349 A | 12/1952 | Whelton et al. |
| 3,419,593 A | 12/1968 | Willing |
| 3,615,272 A | 10/1971 | Collins et al. |
| 3,640,837 A | 2/1972 | Gaeth et al. |
| 4,087,585 A | 5/1978 | Schultz |
| 4,260,780 A | 4/1981 | West |
| 4,276,424 A | 6/1981 | Peterson et al. |
| 4,314,956 A | 2/1982 | Baney et al. |
| 4,324,901 A | 4/1982 | Drahnak |
| 4,325,901 A | 4/1982 | West et al. |
| 4,510,094 A | 4/1985 | Drahnak |
| 4,530,879 A | 7/1985 | Drahnak |
| 4,568,566 A | 2/1986 | Tolentino et al. |
| 4,766,176 A | 8/1988 | Lee et al. |
| 4,841,006 A | 6/1989 | Kobayashi et al. |
| 4,999,397 A | 3/1991 | Weiss et al. |
| 5,010,159 A | 4/1991 | Bank et al. |
| 5,017,654 A | 5/1991 | Togashi et al. |
| 5,063,267 A | 11/1991 | Hanneman et al. |
| 5,112,779 A | 5/1992 | Burns et al. |
| 5,194,649 A | 3/1993 | Okawa |
| 5,283,309 A | 2/1994 | Morita |
| 5,310,843 A | 5/1994 | Morita |
| 5,340,898 A | 8/1994 | Cavezzan et al. |
| 5,358,983 A | 10/1994 | Morita |

(Continued)

FOREIGN PATENT DOCUMENTS

| | | |
|---|---|---|
| GB | 2445821 | 7/2008 |
| JP | 59178749 | 11/1984 |
| JP | 63107122 | 12/1988 |
| JP | 04190509 | 7/1992 |
| JP | 06086017 | 3/1994 |
| JP | 07206482 | 8/1995 |
| JP | 09020867 | 1/1997 |
| JP | 09-095614 | * 4/1997 |
| JP | 2002293585 | 9/2002 |

(Continued)

OTHER PUBLICATIONS

Gao, et al. "Highly Active Visible-Light Photocatalysts for Curing a Ceramic Precursor," Chemical Materials, 1998, vol. 10, pp. 531-536.
Reese, et al. "Development of Silicone Substrates to be used with CIGS Deposition," United States Air Force, 2005.
Weber, et al., "Thin Glass-Polymer Systems as Flexible Subrates for Displays," SID 02 Digest 2002, pp. 53-55.

(Continued)

*Primary Examiner* — Peter Szekely
(74) *Attorney, Agent, or Firm* — Nixon Peabody LLP

(57) ABSTRACT

In various embodiments, provided are novel curable silicone compositions; films and adhesives comprising one or more cured products of said compositions, the films and adhesives exhibiting properties of mechanical flexibility and low flammability. Additionally, the films and adhesives may exhibit one or more of high transparency, low haze, and high refractive index.

18 Claims, 2 Drawing Sheets

(56) References Cited

U.S. PATENT DOCUMENTS

| | | | |
|---|---|---|---|
| 5,468,826 | A | 11/1995 | Gentle et al. |
| 5,468,827 | A | 11/1995 | Morita et al. |
| 5,486,588 | A | 1/1996 | Morita et al. |
| 5,496,961 | A | 3/1996 | Dauth et al. |
| 5,530,075 | A | 6/1996 | Morita et al. |
| 5,565,273 | A | 10/1996 | Egil et al. |
| 5,716,424 | A | 2/1998 | Mennig et al. |
| 5,738,976 | A | 4/1998 | Okinoshima et al. |
| 5,824,761 | A | 10/1998 | Bujanowski et al. |
| 5,859,161 | A | 1/1999 | Imperante et al. |
| 5,861,467 | A | 1/1999 | Bujanowski et al. |
| 5,880,194 | A | 3/1999 | Alvarez et al. |
| 5,959,038 | A | 9/1999 | Furukawa et al. |
| 6,159,606 | A | 12/2000 | Felderie et al. |
| 6,509,423 | B1 | 1/2003 | Zhu |
| 6,623,864 | B1 | 9/2003 | Sweet et al. |
| 6,831,145 | B2 | 12/2004 | Kleter et al. |
| 7,687,587 | B2 | 3/2010 | Smith et al. |
| 2003/0235383 | A1 | 12/2003 | Gardner et al. |
| 2004/0071960 | A1 | 4/2004 | Weber et al. |
| 2004/0214015 | A1 | 10/2004 | Asai et al. |
| 2006/0155039 | A1 | 7/2006 | Alexander et al. |
| 2006/0204765 | A1 | 9/2006 | Scheim et al. |
| 2007/0111014 | A1 | 5/2007 | Katsoulis et al. |
| 2007/0122631 | A1 | 5/2007 | Higuchi et al. |
| 2007/0178292 | A1 | 8/2007 | Hasegawa et al. |
| 2007/0267215 | A1 | 11/2007 | Dernovsek et al. |
| 2008/0051548 | A1 | 2/2008 | Bailey et al. |
| 2008/0138525 | A1 | 6/2008 | Bailey et al. |
| 2009/0105362 | A1 | 4/2009 | Anderson et al. |
| 2009/0155577 | A1 | 6/2009 | Anderson et al. |
| 2009/0298980 | A1 | 12/2009 | Yoshitake et al. |
| 2010/0027584 | A1 | 2/2010 | Zhong et al. |
| 2010/0188766 | A1 | 7/2010 | Harimoto et al. |
| 2011/0027584 | A1 | 2/2011 | Zhong et al. |

FOREIGN PATENT DOCUMENTS

| | | |
|---|---|---|
| JP | 2003246928 | 9/2003 |
| JP | 2007/091940 | 4/2007 |
| WO | WO2005115746 | 12/2005 |
| WO | WO2006/001227 | 1/2006 |
| WO | WO2006/088646 | 8/2006 |
| WO | WO2007/092118 | 8/2007 |
| WO | WO2009/111190 | 9/2009 |
| WO | WO2009/111193 | 9/2009 |
| WO | WO2009/111196 | 9/2009 |
| WO | WO2009/111199 | 9/2009 |
| WO | WO2010/025311 | 3/2010 |

OTHER PUBLICATIONS

International Search Report, PCT/US2011/058517. Dated Feb. 22, 2012, 3 pages.

International Written Opinion, PCT/US2011/058517. Dated Feb. 22, 2012, 7 pages.

* cited by examiner

HYDROSILYLATION CURED SILICONE RESINS PLASTICIZED BY ORGANOPHOSPHOROUS COMPOUNDS

CROSS REFERENCE TO RELATED APPLICATIONS

This application is a U.S. national stage of International Application No. PCT/US2011/058517, filed Oct. 31, 2011, which claims priority to U.S. Provisional Application No. 61/411,536 filed on Nov. 9, 2010, both of which are incorporated herein in their entireties.

FIELD

The present application relates to silicone compositions that are curable to form silicone adhesives and reinforced silicone resin films that may be used for, among other things, the preparation of coated substrates and laminated substrates. The provided films and adhesives exhibit increased mechanical flexibility and comparable or decreased flammability over known low flammability films and adhesives. Additionally, the provided films and adhesives may exhibit one or both of lower haze and increased refractive index as compared to known low flammability films and adhesives.

BACKGROUND

Compositions prepared by combining silicone resins with a cross-linking agent and a hydrosilylation catalyst are generally known in the art. Moreover, it is known that some of said compositions may be cured to form silicone resins and silicone adhesives. Additionally, it is known that some of said resins and adhesives may be used to form laminated substrates.

Silicone resins are useful in a variety of applications by virtue of their unique combination of properties, including high thermal stability, good moisture resistance, excellent flexibility, high oxidization resistance, low dielectric constant, and high transparency. For example, coatings of silicone resins can be used to protect, insulate, or bond a variety of substrates and are widely used in the automotive, electronic, construction, appliance, and aerospace industries. Silicone resins may also be used to form freestanding silicone resin films, which can be used in a variety of applications, notably as components of displays, solar cells, electronic boards, touch screens, fire-resistant wallpapers, impact-resistant windows, and transparent or nontransparent electrodes.

Although many silicone resins are known, there nevertheless remains a need in the art for silicone resins having improved properties, preferably more than one improved property. Moreover, there remains need in the art for laminated substrates comprising such improved resins. However, improving one property of a silicone resin without seriously compromising other properties remains a challenge. For example, decreased flammability can be achieved by increasing crosslink density, but increasing crosslink density causes embrittlement of the cured resin, thereby decreasing mechanical flexibility. Thus, there exists a need for approaches to improving at least one property of silicone resins without compromising the others. There also exists a need for low flammability silicone adhesives and films having improved mechanical flexibility over known low flammability silicone adhesives and films.

SUMMARY

These needs are met by embodiments of the present application, which provide novel hydrosilylation-curable silicone compositions, and films and adhesives comprising one or more cured products of said compositions, wherein said compositions, films and adhesives have one or more improved properties over those of known compositions, films, and adhesives.

In various embodiments, provided are silicone compositions comprising: (A) a hydrosilylation-curable silicone composition comprising (i) at least one silicone resin having an average of at least two silicon-bonded alkenyl groups and at least one silicon-bonded hydrocarbyl group per molecule; (ii) at least one organosilicon compound having an average of at least two silicon-bonded hydrogen atoms per molecule; (iii) a hydrosilylation catalyst; and (B) at least one organophosphate compound; wherein at least 50 mol % of the silicon-bonded hydrocarbyl groups in the resin are the same as the organic groups in the organophosphate compound. Also provided are silicone resin films and adhesives comprising the cured product of said silicone compositions, wherein said films and adhesives have improved mechanical flexibility and retained low flammability as compared to known films and adhesives. Additionally, the provided films and adhesives may have one or more properties of haze, transparency, and refractive index that are comparable with or improved over those of known films and adhesives.

In various embodiments, also provided are reinforced silicone resin films comprising a fiber reinforcement embedded into a cured product of the provided silicone composition. Said reinforced films have improved mechanical flexibility and retained low flammability as compared to known reinforced films. Additionally, the provided films may have one or more properties of haze, transparency, and refractive index that are comparable with or improved over those of known reinforced films.

In various embodiments, additionally provided are laminated substrates comprising (A) a first substrate; (B) at least one additional substrate overlying the first substrate; and (C) a provided silicone adhesive coating on at least a portion of each substrate, wherein at least one of the substrates is a provided reinforced silicone resin film; and wherein at least a portion of the adhesive coating is between and in direct contact with opposing surfaces of adjacent substrates.

These and additional features and advantages of the invention will become apparent in the course of the following detailed description.

BRIEF DESCRIPTION OF THE DRAWINGS

A more complete appreciation of the invention and the many embodiments thereof will be readily obtained as the same becomes better understood by reference to the following detailed description when considered in connection with the accompanying drawings, wherein.

DETAILED DESCRIPTION

Figure 1:
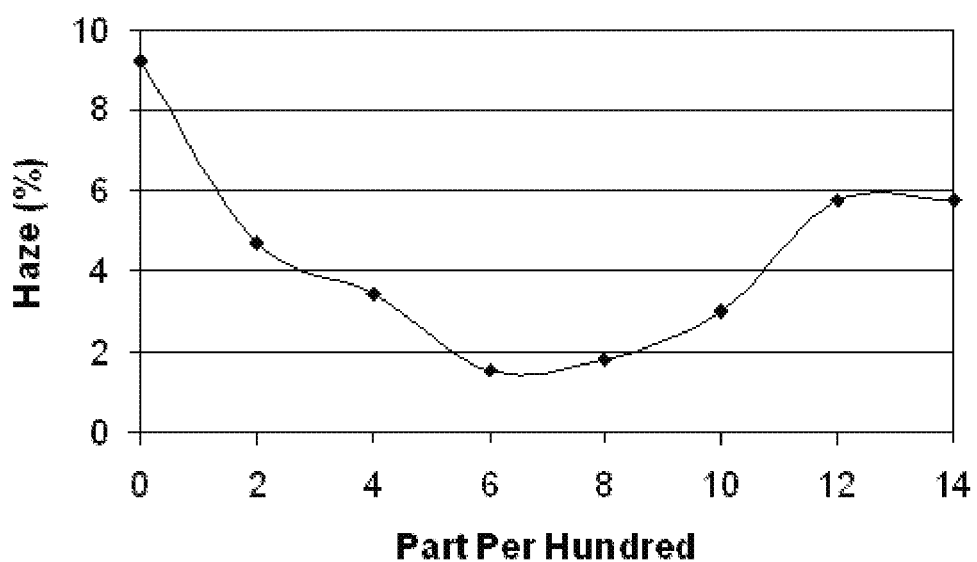
FIG. 1 depicts haze value as a function of amount of an organophosphate in the silicone resins of Example 1, illustrating that the organophosphate was compatible with the highly cross-linked silicone resins and formed an optically transparent slab.

Features and advantages of the invention will now be described with occasional reference to specific embodiments. However, the invention may be embodied in different forms and should not be construed as limited to the embodiments set forth herein. Rather, these embodiments are provided so that this disclosure will be thorough and complete and will fully convey the scope of the invention to those skilled in the art.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

As used in the specification and appended claims, the terms "R group" and "R groups" are intended, unless the context clearly indicates otherwise, to include all forms of "R" described herein (R, $R^1$, $R^2$, $R^3$, $R^4$, etc.) without limitation.

The term "independently selected from," as used in the specification and appended claims, is intended to mean that the referenced groups can be the same, different, or a mixture thereof, unless the context clearly indicates otherwise. Thus, under this definition, the phrase "$X^1$, $X^2$, and $X^3$ are independently selected from noble gases" would include the scenario where $X^1$, $X^2$, and $X^3$ are all the same, where $X^1$, $X^2$, and $X^3$ are all different, and where $X^1$ and $X^2$ are the same but $X^3$ is different.

As used in the specification and appended claims, the terms "alkene" and "alkenyl" refer, unless the context clearly indicates otherwise, to a monovalent hydrocarbon group containing at least one aliphatic carbon-carbon double bond.

The term "cured product of the provided silicone compositions," as used in the specification and appended claims, refers to a cross-linked polysiloxane resin having a three-dimensional network structure, unless the context clearly indicates otherwise.

As used in the specification and appended claims, the term "overlying" is intended, unless the context clearly indicates otherwise, to mean at least partial covering of a first substrate by a second substrate lying over or upon at least a portion of the first substrate, but not in direct contact with the first substrate.

Unless otherwise indicated, all numbers expressing quantities of ingredients, properties such as molecular weight, reaction conditions, and so forth as used in the specification and claims are to be understood as being modified in all instances by the term "about." Additionally, the disclosure of any ranges in the specification and claims are to be understood as including the range itself and also anything subsumed therein, as well as endpoints. Unless otherwise indicated, the numerical properties set forth in the specification and claims are approximations that may vary depending on the desired properties sought to be obtained in embodiments of the present invention. Notwithstanding that numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Provided are novel hydrosilylation-curable silicone compositions; silicone resin films and adhesives comprising one or more cured products of said compositions; and laminated substrates comprising said silicone resin films and adhesives. In various embodiments, the provided silicone compositions comprise: (A) a hydrosilylation-curable silicone composition comprising (i) at least one silicone resin comprising at least one silicon-bonded hydrocarbyl group per molecule; (ii) at least one organosilicon compound; and (iii) a hydrosilylation catalyst; and (B) at least one organophosphate compound; wherein at least 50 mol % of the silicon-bonded hydrocarbyl groups in the resin are the same as the organic groups in the organophosphate compound.

Silicone compositions comprising a silicone resin and a phosphorous-containing compound are known. For example, US2009/0298980 A1 discloses a hydrosilylation-curable silicone composition containing a silicone resin and phosphorous-containing hydrosilylation catalyst inhibitor. As another example, JP9095614A (Dow Corning Toray Silicone) discloses a hydrosilylation-curable silicone composition comprising an organopolysiloxane containing an average of at least two silicon-bonded alkenyl groups per molecule and a phosphoric acid ester compound. However, said applications do not disclose a silicone composition comprising a silicone resin and an organophosphate compound, wherein a predetermined percentage of the organic groups in the organophosphate and the silicon-bonded organic groups in the resin are the same. Moreover, said applications do not disclose the silicone compositions, silicone adhesives, silicone resin films, and laminated substrates provided by the present application. Importantly, the provided silicone resin films and adhesives, which comprise at least one cured product of the provided compositions, have improved mechanical flexibility and retained low flammability as compared to known films and adhesives. Additionally, the provided films and adhesives may have one or more properties of haze, transparency, and refractive index that are comparable with or improved over those of known films and adhesives. For example, the provided low flammability films and adhesives may have improved mechanical flexibility and one or more of lower haze, higher transparency and higher refractive index over known low flammability films and adhesives. With respect to transparency, the provided films and adhesives may, in some embodiments, exhibit a transparency (defined as percent transmittance in the visible region of the electromagnetic spectrum through a 1 mm thick slab of adhesive or film) of at least 50%; alternatively, at least 60%; alternatively, at least 75%. For example, the provided films and adhesives may have a transparency of from about 50-55%, 55-60%, 60-65%, 65-70%, 70-75%, 75-80%, 80-85%, 85-90%, 90-95%, 95-100%, or combinations thereof. With respect to haze, the provided films and adhesives may, in some embodiments, exhibit a haze of less than 10%. For example, the provided films and adhesives may have a haze of from about 0-1%, 1-2%, 2-3%, 3-4%, 4-5%, 5-6%, 6-7%, 7-8%, 8-9%, 9-10%, or combinations thereof. With respect to flammability, the provided films and adhesives may, in some embodiments, exhibit LOI (Limiting Oxygen Index) value of greater than 20%; alternatively greater than 22%; alternatively greater than 24%; alternatively greater than 26%; alternatively greater than 28%. For example, the provided films and adhesives may have a LOI value of from about 20-30%, 30-40%, 40-50%, 50-60%, 60-70%, 70-80%, 80-90%, 90-100%, or combinations thereof. With respect to refractive index, the provided films and adhesives may, in some embodiments, exhibit refractive index greater than 1.48; alternatively greater than 1.5; alternatively greater than 1.52. For example, the provided films and adhesives may have a refractive index of from about 1.48-1.52, 1.52-1.56, 1.56-1.6, 1.6-1.64, 1.64-1.68, 1.68-1.72, 1.72-1.76, 1.76-1.8, 1.8-1.84, 1.84-1.88, 1.88-1.9, or combinations thereof. With respect to mechanical flexibility, the provided films and adhesives may, in some embodiments, exhibit an elongation at break of greater than 10%; alternatively greater than 15%; alternatively greater than 20%; alternatively greater than 25%. For example, the provided films and adhesives may have an elongation at break of from about 10-20%, 20-30%, 30-40%, 40-50%, 50-60%, 60-70%, 70-80%, 80-90%, 90-100%, or combinations thereof. As another example, the provided films and adhesives may have an elongation at break of from about 100-200%, 200-300%, 300-400%, 400-500%, 500-600%, 600-700%, 700-800%, 800-900%, 900-1000%, or combinations thereof.

In various embodiments, provided are silicone compositions, comprising: (A) a hydrosilylation-curable silicone composition comprising: (i) at least one silicone resin comprising at least one silicon-bonded $C_1$ to $C_{10}$ alkyl or $C_6$-$C_{20}$ aryl group, or halogen-substituted derivative thereof, said resin having an average of at least two silicon-bonded alkenyl groups per molecule; (ii) at least one organosilicon compound having an average of at least two silicon-bonded hydrogen atoms per molecule in an amount sufficient to cure the silicone resin of component (i); and (iii) a hydrosilylation catalyst; and (B) an organophosphate compound selected from: (i) at least one organophosphate having the formula (I):

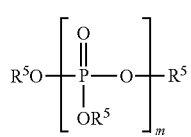

(I)

(ii) at least one organophosphate having the formula (II):

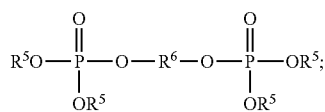

(II)

or
(iii) combinations thereof; wherein $R^5$ is $C_1$ to $C_{10}$ alkyl or $C_6$-$C_{20}$ aryl; $R^6$ is hydrocarbylene, and m has a value of from 1 to 20; and wherein at least 50 mol % of the silicon-bonded alkyl or aryl groups in the silicone resin of Component (A) are the same as the groups $R^5$ in the organophosphate compound. In some embodiments, the mol % of the alkyl or aryl groups in the silicone resin of Component (A) that are the same as the groups $R^5$ in the organophosphate compound may be selected from about 50-60 mol %, 60-70 mol %, 70-80 mol %, 80-90 mol %, 90-100 mol %, or combinations thereof.

In some embodiments, the provided silicone compositions comprise an amount of Component (A) that is sufficient to cause the provided silicone composition to cure to a product having mechanical flexibility that is greater than, and flammability that is similar to or less than, that of cured products of known silicone compositions. Additionally, the cured product may have one or more improved properties of haze, transparency, and refractive index than cured products of known silicone compositions. In some embodiments, the amount of Component (A) in the provided composition may be from about 15 to 99.9% (w/w). For example, the amount of Component (A) may be from about 15-30% (w/w), 30-45% (w/w), 45-60% (w/w), 60-75% (w/w), 75-90% (w/w), 90-99.9% (w/w), and combinations thereof. In some embodiments, the provided silicone compositions also comprise an amount of Component (B) that is sufficient to cause the provided silicone composition to cure to a product having mechanical flexibility that is greater than, and flammability that is similar to or less than, that of cured products of known silicone compositions. Additionally, the cured product may have one or more improved properties of haze, transparency, and refractive index than cured products of known silicone compositions. In some embodiments, the amount of Component (B) in the provided composition may be from about 1 to 20% (w/w). For example, the amount of Component (B) may be from about 1-4% (w/w), 4-8% (w/w), 8-12% (w/w), 12-16% (w/w), 16-20% (w/w), and combinations thereof.

Silicone Resin of Component (A)

In various embodiments, Component (A) of the provided silicone compositions comprises (i) at least one silicone resin comprising at least one silicon-bonded $C_1$ to $C_{10}$ alkyl, $C_6$-$C_{20}$ aryl group, or halogen-substituted derivative thereof, said resin having an average of at least two silicon-bonded alkenyl groups per molecule. Component (A) may comprise a single silicone resin or a mixture of two or more different silicone resins. In various embodiments, Component (A) comprises one or more non-linear resins.

The provided silicone resins comprise siloxane structural units selected from:

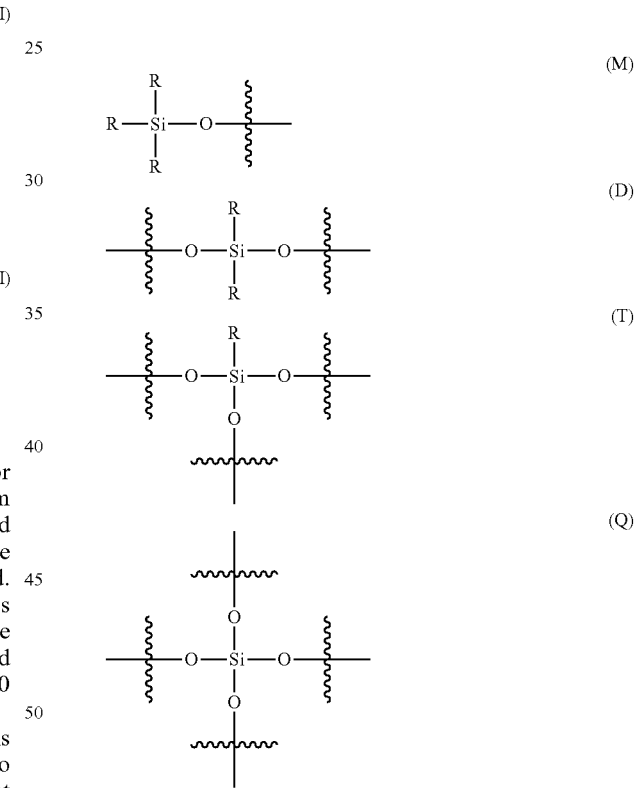

wherein M represents a monofunctional unit $R_3SiO_{1/2}$; D represents a difunctional unit $R_2SiO_{2/2}$; T represents a trifunctional unit $RSiO_{3/2}$; and Q represents a tetrafunctional unit $SiO_{4/2}$. A provided silicone resin may be a copolymer containing T, Q, or both in combination with M, D, or both. For example, a provided silicone resin may be selected from a DT resin, a MT resin, a MDT resin, a DTQ resin, a MTQ resin, a MDTQ resin, a DQ resin, a MQ resin, a DTQ resin, a MTQ resin, and a MDQ resin.

In some embodiments, the provided silicone resin of Component (A) may have formula (III):

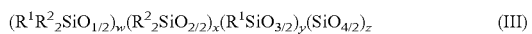

(III)

wherein each $R^1$ is independently selected from $C_1$ to $C_{10}$ alkyl, $C_6$ to $C_{20}$ aryl, or halogen-substituted derivates thereof; each $R^2$ is independently selected from $R^1$ or an alkenyl group, provided that the resin has an average of at least two silicon-bonded alkenyl groups per molecule; and wherein w, x, y, and z are mole fractions with w=0 to 0.8, x=0 to 0.6, y=0 to 0.99, z=0 to 0.35; and wherein w+x+y+z=1, y+z/(w+x+y+z)=0.2 to 0.99, and w+x/(w+x+y+z)=0.01 to 0.8. In some embodiments, y+z/(w+x+y+z) may be from about 0.5 to 0.95; alternatively from about 0.65 to 0.9. In some embodiments, w+x/(w+x+y+z) may be from about 0.05 to 0.5, alternatively from 0.1 to 0.35.

The groups represented by $R^1$ may have from 1 to 10 carbon atoms, alternatively from 1 to 6 carbon atoms; alternatively, 6 to 20 carbon atoms. Acyclic hydrocarbyl and halogen-substituted hydrocarbyl groups containing at least 3 carbon atoms can have a branched or unbranched structure. Suitable $R^1$ groups may be independently selected from alkyl, cycloalkyl, aryl, alkaryl, aralkyl, and halogen-substituted derivatives thereof. Examples of suitable $R^1$ groups include, but are not limited to, methyl; ethyl; propyl; 1-methylethyl; butyl; 1-methylpropyl; 2-methylpropyl; 1,1-dimethylethyl; pentyl; 1-methylbutyl; 1-ethylpropyl; 2-methylbutyl; 3-methylbutyl; 1,2-dimethylpropyl; 2,2-dimethylpropyl; hexyl; heptyl; octyl; nonyl; decyl; cyclopentyl; cyclohexyl; methylcyclohexyl; phenyl; naphthyl; tolyl; xylyl; benzyl; phenethyl; 3,3,3-trifluoropropyl; 3-chloropropyl; chlorophenyl; dichlorophenyl; 2,2,2-trifluoroethyl; 2,2,3,3-tetrafluoropropyl; and 2,2,3,3,4,4,5,5-octafluoropentyl.

The alkenyl groups represented by $R^2$ may be the same or different, and typically have from 2 to about 10 carbon atoms, alternatively from 2 to 6 carbon atoms. Examples of suitable $R^2$ groups include, but are not limited to, vinyl, allyl, butenyl, hexenyl, and octenyl. In some embodiments, at least 5 mol % of the groups $R^2$ in the silicone resin are alkenyl. The term "mol %," as used in this context, means the ratio of the number of moles of silicon-bonded alkenyl groups in the silicone resin to the total number of moles of the $R^2$ groups in the resin, multiplied by 100. In some embodiments, the mol % of the groups $R^2$ in the silicone resin that are alkenyl groups may be selected from 5-10 mol %, 10-20 mol %, 20-30 mol %, 30-40 mol %, 40-50 mol %, 50-60 mol %, 60-70 mol %, 70-80 mol %, 80-90 mol %, 90-100 mol %, or combinations thereof.

In various embodiments, Component (A) may comprise at least one silicone resin of formula (III), which has subscript w, which may have a value of from about 0 to 0.8. Accordingly, w may have a value of from about 0-0.1, 0.1-0.2; 0.2-0.3, 0.3-0.4, 0.4-0.5, 0.5-0.6, 0.6-0.7; 0.7-0.8, and combinations thereof. For example, w may have a value of from about 0.02 to 0.75; alternatively from 0.05 to 0.3. Formula (III) also has subscript x, which may have a value of from about 0 to 0.6. Accordingly, x may have a value of from about 0-0.1, 0.1-0.2; 0.2-0.3, 0.3-0.4, 0.4-0.5, 0.5-0.6, and combinations thereof. For example, x may have a value of from about 0 to 0.45, alternatively from 0 to 0.25. Additionally, formula (III) has subscript y, which may have a value of from about 0 to 0.99. Accordingly, y may have a value of from about 0-0.1, 0.1-0.2; 0.2-0.3, 0.3-0.4, 0.4-0.5, 0.5-0.6, 0.6-0.7, 0.7-0.8, 0.8-0.9, 0.9-0.99, and combinations thereof. For example, y may have a value of from about 0.25 to 0.8, alternatively from 0.5 to 0.8. Formula (III) also has subscript z, which may have a value of from about 0 to 0.35. Accordingly, z may have a value of from about 0-0.1, 0.1-0.15, 0.15-0.2, 0.2-0.25, 0.25-0.3, 0.3-0.35, and combinations thereof. For example, z may have a value of from about 0 to 0.25, alternatively from 0 to 0.15.

Examples of silicone resins suitable for Component (A) may include, but are not limited to, resins having the following formulae: $(Vi_2MeSiO_{1/2})_{0.25}(PhSiO_{3/2})_{0.75}$, $(ViMe_2SiO_{1/2})_{0.25}(PhSiO_{3/2})_{0.75}$, $(ViMe_2SiO_{1/2})_{0.25}(MeSiO_{3/2})_{0.25}(PhSiO_{3/2})_{0.50}$, $(ViMe_2SiO_{1/2})_{0.15}(PhSiO_{3/2})_{0.75}(SiO_{4/2})_{0.1}$, $(CH_2=CHCH_2(Me_2)Si)_{0.3}(Me_2SiO_{2/2})_{0.2}(MeSiO_{3/2})_{0.5}$, and $(Vi_2MeSiO_{1/2})_{0.15}(ViMe_2SiO_{1/2})_{0.1}(PhSiO_{3/2})_{0.75}$, where "Me" is methyl, "Vi" is vinyl, and "Ph" is phenyl.

In some embodiments, the silicone resins of formula (III) may have a number-average molecular weight ($M_n$) of from 500 to 500,000; alternatively from 1000 to 200,000; alternatively from 1000 to 50,000; alternatively from 1000 to 20,000, where the molecular weight may be determined by standard techniques, such as by employing a refractive index detector and silicone resin (MQ) standards.

Methods of preparing silicone resins are well known in the art, and many silicone resins are commercially available. Typically, silicone resins are prepared by cohydrolyzing the appropriate mixture of chlorosilane precursors in an organic solvent, such as toluene. For example, a MT resin having $R^1R^2_2SiO_{1/2}$ and $R^1SiO_{3/2}$ structural units can be prepared by cohydrolyzing $R^1R^2_2SiCl$ and $R^1SiCl_3$ in toluene, where $R^1$ and $R^2$ are as defined as described above with respect to formula (III). The aqueous hydrochloric acid and silicone hydrolyzate are separated and the hydrolyzate is washed with water to remove residual acid and heated in the presence of a mild condensation catalyst to "body" the resin to the requisite viscosity. If desired, the resin can be further treated with a condensation catalyst in an organic solvent to reduce the content of silicon-bonded hydroxy groups. Alternatively, silanes containing hydrolysable groups other than chloro, such —Br, —I, —OCH$_3$, —OC(O)CH$_3$, —N(CH$_3$)$_2$, NHCOCH$_3$, and —SCH$_3$, can be utilized as starting materials in the cohydrolysis reaction. The properties of the resin products depend on the types of silanes used, the mole ratio of silanes, the degree of condensation, and the processing conditions.

Organosilicon Compound of Component (A)

In various embodiments, Component (A) of the provided silicone compositions comprises (ii) at least one organosilicon compound having an average of at least two silicon-bonded hydrogen atoms per molecule. Component (A) may comprise a single organosilicon compound or a mixture comprising two or more different organosilicon compounds. In some embodiments, the organosilicon compound selected may have at least three silicon-bonded hydrogen atoms per molecule The organosilicon compound is present in an amount sufficient to cure (i.e., cross-link) the silicone resin. The exact amount of organosilicon compound required depends on the desired extent of cure, which generally increases as the ratio of the number of moles of silicon-bonded hydrogen atoms in the organosilicon compound to the number of moles of alkenyl groups in silicone resin increases. In some embodiments, the concentration of organosilicon in Component (A) may be sufficient to provide from about 0.4 to 1.5 moles of silicon-bonded hydrogen atoms in the organosilicon compound per mole of alkenyl groups in the silicone resin. For example, the concentration of organosilicon compound may be sufficient to provide from about 0.4-0.7 moles, 0.7-1.0 moles, 1.0-1.1 moles, 1.1-1.2 moles, 1.2-1.3 moles, 1.3-1.4 moles, 1.4-1.5 moles, and combinations thereof, of silicon-bonded hydrogen atoms in the organosilicon compound per mole of alkenyl groups in the silicone resin.

The structure of the organosilicon compound can be linear, branched, cyclic, or resinous. In some embodiments, the organosilicon compound can be an organohydrogensilane or an organohydrogensiloxane, wherein an organohydrogensilane can be a monosilane, disilane, trisilane, or polysilane, and an organohydrogensiloxane can be a disiloxane, trisiloxane, or polysiloxane. Cyclosilanes and cyclosiloxanes typically have from 3 to 12 silicon atoms; alternatively from 3 to 10 silicon atoms; alternatively from 3 to 4 silicon atoms. In acyclic polysilanes and polysiloxanes, the silicon-bonded hydrogen atoms can be located at terminal, pendant, or at both terminal and pendant positions.

Suitable organohydrogensilanes may have a formula of $H_aR^1_{4-a}Si$, where $R^1$ is as defined above; and a is from 2 to 3. Examples include, but are not limited to, $H_2Ph_2Si$, $H_2MePhSi$, and $H_3PhSi$.

A suitable organohydrogensilane may have the formula $$HR^1_2Si\text{—}R^3\text{—}SiR^1_2H; \quad (IV)$$

wherein $R^1$ is free from aliphatic unsaturation and is independently selected from $C_1$ to $C_{10}$ hydrocarbyl or halogen-substituted derivative thereof; and $R^3$ is a hydrocarbylene group free of aliphatic unsaturation having a formula selected from:

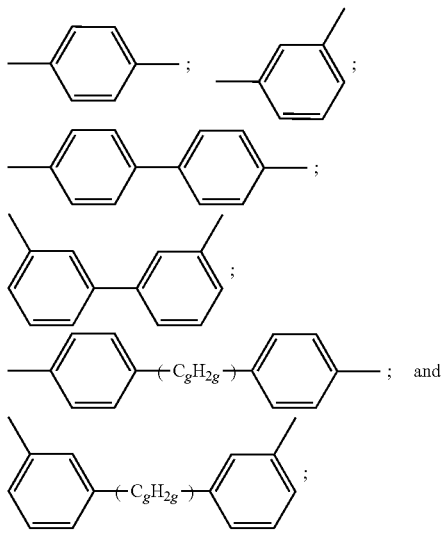

wherein g is from 1 to 6. The groups represented by $R^1$ are as described with respect to formula (III). Accordingly, examples of said organohydrogensilanes include, but are not limited to, silanes having the following formulae:

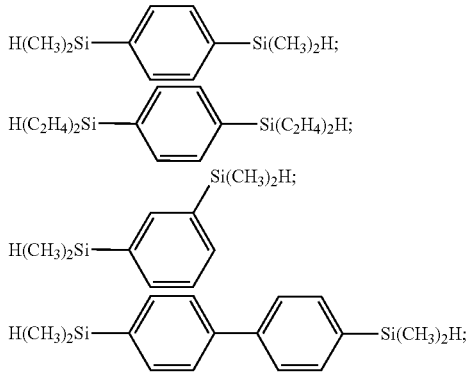

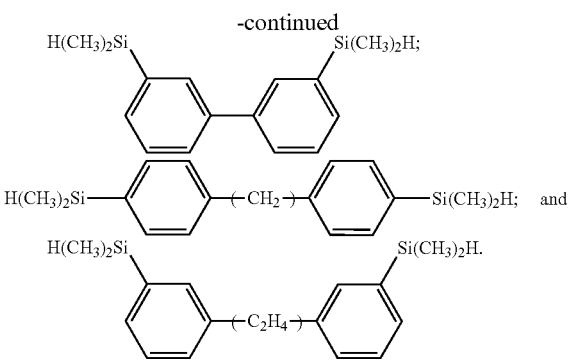

Examples of suitable organohydrogensilanes include, but are not limited to, diphenylsilane, 2-chloroethylsilane, bis[(p-dimethylsilyl)phenyl]ether, 1,4-dimethyldisilylethane, 1,3,5-tris(dimethylsilyl)benzene, 1,3,5-trimethyl-1,3,5-trisilane, poly(methylsilylene)phenylene, and poly(methylsilylene)methylene.

A suitable organohydrogensiloxane can have the formula (V):

$$(R^1R^4_2SiO_{1/2})_w(R^4_2SiO_{2/2})_x(R^1SiO_{3/2})_y(SiO_{4/2})_z; \quad (V)$$

wherein $R^1$ is free from aliphatic unsaturation and is independently selected from $C_1$ to $C_{10}$ hydrocarbyl or halogen-substituted derivates thereof; $R^4$ is independently selected from $R^1$, —H, or an organosilylalkyl group having at least one silicon-bonded hydrogen atom; and wherein w, x, y, and z are mole fractions with w=0-0.8, x=0-0.6, y=0-0.99, z=0-0.35; and wherein w+x+y+z=1, y+z/(w+x+y+z) is from 0.2 to 0.99, and w+x/(w+x+y+z) is from 0.01 to 0.8, provided at least 20 mol % of the groups $R^4$ are either —H or organosilylalkyl groups having at least one silicon-bonded hydrogen atom. In some embodiments, the mol % of the groups $R^4$ that are either —H or organosilylalkyl groups having at least one silicon-bonded hydrogen atom may be selected from about 20-30 mol %, 30-40 mol %, 40-50 mol %, 50-60 mol %, 70-80 mol %, 80-90 mol %, 90-100 mol %, or combinations thereof.

The hydrocarbyl and halogen-substituted hydrocarbyl groups represented by $R^1$ are as described with respect to formula (III). Examples of suitable $R^4$ organosilylalkyl groups include, but are not limited to, groups having the following formulae:

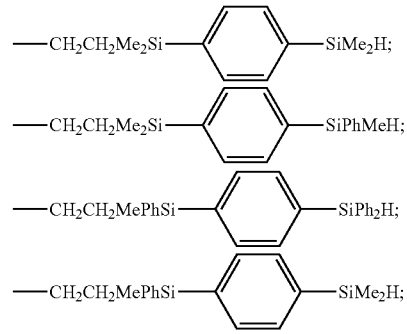

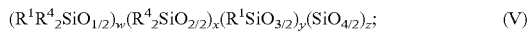

—$CH_2CH_2SiMe_2H$;  —$CH_2CH_2SiMe_2C_nH_{2n}SiMe_2H$;
—$CH_2CH_2SiMe_2C_nH_{2n}SiMePhH$;  —$CH_2CH_2SiMePhH$;
—$CH_2CH_2SiPh_2H$;  —$CH_2CH_2SiMePhC_nH_{2n}SiPh_2H$;
—$CH_2CH_2SiMePhC_nH_{2n}SiMe_2H$;
—$CH_2CH_2SiMePhOSiMePhH$;  and
—$CH_2CH_2SiMePhOSiPh(OSiMePhH)_2$; wherein Me is methyl, Ph is phenyl, and the subscript n has a value of from 2 to 10.

Examples of suitable organohydrogensiloxanes include, but are not limited to, 1,1,3,3-tetramethyldisiloxane; 1,1,3,3-tetraphenyldisiloxane; phenyltris(dimethylsiloxy)silane; 1,3,5-trimethylcyclotrisiloxane; a trimethylsiloxy-terminated poly(methylhydrogensiloxane); a trimethylsiloxy-terminated poly(dimethylsiloxane/methylhydrogensiloxane); and a dimethylhydrogensiloxy-terminated poly(methylhydrogensiloxane).

In some embodiments, Component (A) may comprise a single organohydrogensilane, a mixture of two different organohydrogensilanes, a single organohydrogensiloxane, a mixture of two different organohydrogensiloxanes, or a mixture of an organohydrogensilane and an organohydrogensiloxane. For example, Component (A) may comprise a mixture having at least 0.5% (w/w), alternatively at least 50% (w/w), alternatively at least 75% (w/w), based on the total weight of the mixture, of an organohydrogenpolysiloxane resin and an organohydrogensilane and/or organohydrogensiloxane, the latter different from the former organohydrogenpolysiloxane resin.

Methods of preparing organosilicon compounds containing silicon-bonded hydrogen atoms are well known in the art. For example, organohydrogensilanes can be prepared by reaction of Grignard reagents with alkyl or aryl halides. In particular, organohydrogensilanes having the formula (IV), $HR^1_2Si—R^3—SiR^1_2H$ as described above, can be prepared by treating an aryl dihalide having the formula $R^3X_2$ with magnesium in ether to produce the corresponding Grignard reagent and then treating the Grignard reagent with a chlorosilane having the formula $HR^1_2SiCl$, where $R^1$ and $R^3$ are as described with respect to formula (IV).

Methods of preparing organohydrogensiloxanes, such as the hydrolysis and condensation of organohalosilanes, are also well known in the art. For example, an organohydrogenpolysiloxane resin can be prepared by reacting a silicone resin with an organosilicon compound having an average of from two to four silicon-bonded hydrogen atoms per molecule and a molecular weight less than 1,000, in the presence of a hydrosilylation catalyst and, optionally, an organic solvent, provided the silicone resin (a) has an average of at least two silicon-bonded alkenyl groups per molecule, and the mole ratio of silicon-bonded hydrogen atoms in (b) to alkenyl groups in (a) is from 1.5 to 5.

Hydrosilylation Catalyst of Component (A)

In various embodiments, Component (A) comprises (iii) at least one hydrosilylation catalyst. Component (A) may comprise a single hydrosilylation catalyst or a mixture comprising two or more different catalysts that differ in at least one property, such as structure, form, metal, complexing ligand, and encapsulation material (e.g. thermoplastic resin type). The catalyst can be any catalyst capable of promoting an addition reaction of the provided (i) at least one silicone resin with the provided (ii) at least one organosilicon compound. Non-limiting examples of hydrosilylation catalysts include compounds comprising a group VIIIB metal. Examples of suitable group VIIIB metals include platinum, rhodium, ruthenium, palladium, osmium and iridium. Good results have been obtained when the group VIIIB metal is platinum.

In some embodiments, Component (A) comprises a hydrosilylation catalyst comprising platinum. Examples of suitable platinum-containing catalysts are complexes of chloroplatinic acid and certain vinyl-containing organosiloxanes, such as those disclosed by in U.S. Pat. No. 3,419,593, the description of which is hereby incorporated by reference. An example of such a catalyst is the reaction product of chloroplatinic acid and 1,3-diethenyl-1,1,3,3-tetramethyldisiloxane.

In some embodiments, the hydrosilylation catalyst may be a microencapsulated group VIIIB metal-containing catalyst. Compositions containing microencapsulated hydrosilylation catalysts are stable for extended periods of time, typically several months or longer, under ambient conditions, yet cure relatively rapidly at temperatures above the melting or softening point of the encapsulating material, such as a thermoplastic resin. Microencapsulated hydrosilylation catalysts and methods of preparing them are well known in the art.

The concentration of hydrosilylation catalyst used in Component (A) is sufficient to catalyze the addition reaction of the provided (i) at least one silicone resin with the provided (ii) at least one organosilicon compound. In some embodiments, the concentration of hydrosilylation catalyst is sufficient to provide from about 0.1 to 1000 ppm of a group VIIIB metal, based on the combined weight of silicone resin and organosilicon compound. Accordingly, the concentration of hydrosilylation catalyst used may be sufficient to provide from about 0.1-10 ppm, 10-50 ppm, 50-100 ppm, 100-200 ppm, 200-300 ppm, 300-400 ppm, 400-500 ppm, 500-600 ppm, 600-700 ppm, 700-800 ppm, 800-900 ppm, 900-1000 ppm, and combinations thereof, of a group VIIIB metal. For example, the concentration may be sufficient to provide from about 0.5 to 500 ppm of a group VIII metal; alternatively, from about 1 to 20 ppm.

Organophosphate Compound of Component (B)

In various embodiments, Component (B) of the provided silicone compositions comprises at least one organophosphate compound selected from: (i) an organophosphate having the formula (I):

(ii) an organophosphate having the formula (II):

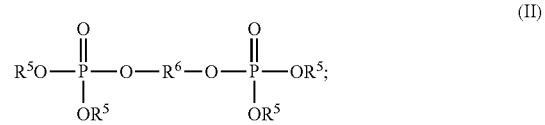

or
(iii) combinations thereof;
wherein each $R^5$ is independently selected from $C_1$ to $C_{10}$ alkyl or $C_6$-$C_{20}$ aryl; $R^6$ is hydrocarbylene; and m has a value of from 1 to 20; and wherein at least 50 mol % of the $R^1$ alkyl or aryl groups in the silicone resin of Component (A) are the same as the groups $R^5$ in the organophosphate compound. Accordingly, when groups $R^5$ in the organophosphate compound are $C_1$ to $C_{10}$ alkyl, at least 50 mol % of the groups $R^1$ in the silicone resin of Component (A) are $C_1$ to $C_{10}$ alkyl. Similarly, when groups $R^5$ in the organophosphate compound are $C_6$-$C_{20}$ aryl, at least 50 mol % of the groups $R^1$ in the silicone resin of Component (A) are $C_6$-$C_{20}$ aryl. In some embodiments, the mol % of the $R^1$ groups in the silicone resin of Component (A) that are the same as the groups $R^5$ in the organophosphate compound may be selected from about 50-60 mol %, 60-70 mol %, 70-80 mol %, 80-90 mol %, 90-100 mol %, or combinations thereof.

The groups represented by $R^5$ may have from 1 to 10 carbon atoms; alternatively from 1 to 6 carbon atoms; alternatively from 6-20 carbon atoms. Suitable $R^5$ groups may be independently selected from alkyl, cycloalkyl, aryl, alkaryl, and aralkyl. Examples of suitable $R^5$ groups include, but are not limited to, methyl; ethyl; propyl; 1-methylethyl; butyl; 1-methylpropyl; 2-methylpropyl; 1,1-dimethylethyl; pentyl; 1-methylbutyl; 1-ethylpropyl; 2-methylbutyl; 3-methylbutyl; 1,2-dimethylpropyl; 2,2-dimethylpropyl; hexyl; heptyl; octyl; nonyl; decyl; cyclopentyl; cyclohexyl; methylcyclohexyl; phenyl; naphthyl; tolyl; xylyl; benzyl; and phenethyl.

Examples of suitable $R^6$ groups include, but are not limited to, $-CH_2-$; $-C_2H_4-$; $-C_3H_6-$; $-C_4H_8-$; $-C_4H_6-(1,3\text{-cyclobutylene})$; $-C_5H_{10}-$; $-C_5H_8-(1,3\text{-cyclohexylene})$; $-C_6H_4-$; biphenylene; bisphenol A; and napthylene.

These and other embodiments rely, at least in part, upon the discovery by inventors that when organic groups of the organophosphate compound of Component (B) match the silicon-bonded hydrocarbyl groups of the silicone resin of Component (A), and the ratio of organophosphate/resin in the silicone composition is within specified parameters, transparency of the cured products is comparable to or greater than to that of cured products of known silicone compositions, mechanical flexibility of the cured products is greater than that of cured products of known silicone compositions, and flammability of the cured products is comparable to or less than that of cured products of known silicone compositions. In some embodiments, the cured products of the provided silicone compositions may additionally exhibit one or both of lower haze and greater refractive index than cured products of known silicone compositions. For example, resins developed using this approach may have increased refractive index over compositions lacking organophosphate compounds or lacking organophosphate compounds in within the specified parameters, and said resins may be combined with certain inorganic reinforcements (such as glass fibers) to form transparent reinforced films. Thus, the inventors have developed an approach to improving at least one property of silicone resins without compromising the others. The low flammability silicone compositions, adhesives and films developed using this approach exhibit improved mechanical flexibility over known low flammability silicone adhesives and films, and have one or more other properties (such as transparency) that are comparable to or better than known compositions, adhesives and films.

The provided silicone compositions comprise an organophosphate compound in Component (B), which is in contrast to known compositions that cure to form low flammability silicone resin adhesives and films. The amount of organophosphate used in the provided compositions is such that the cured products have higher mechanical flexibility than cured products of known silicone compositions, while maintaining or improving upon one or more properties of low flammability, low haze, high transparency, and high refractive index. In some embodiments, the amount of organophosphate compound present may be sufficient to provide from about 1 to 20% (w/w) of organophosphate compound to the silicone composition. Accordingly the amount of organophosphate compound may be from about 1-4% (w/w), 4-8% (w/w), 8-12% (w/w), 12-16% (w/w), 16-20% (w/w), and combinations thereof. In some embodiments, the organophosphate compound is present in the silicone composition in an amount of from about 0.01 ppm to 10,000 ppm. For example, the organophosphate compound may be present in an amount of from about 0.1 to 1000 ppm; alternatively, from about 0.1 to 500 ppm; alternatively, from about 0.5 to 250 ppm; alternatively, from about 0.5 to 150 ppm; alternatively, from about 0.5 to 100 ppm; alternatively, from about 0.5 to 50 ppm; alternatively, from about 1 to 30 ppm.

Examples of suitable organophosphate compounds include, but are not limited to, triphenyl phosphate, trimethyl phosphate, diphenylmethylphosphate, dimethylphenylphosphate, triethylphsophate, diethylphenylphosphate, tris-n-butylphosphate, tris-t-butylphosphate, tris-n-propylphosphate, tris-isopropylphosphate, triscyclohexylphosphate, pentyl-diphenylphosphate, tricresylphosphate, trixylylphosphate, resorcinol bis(diphenylphosphate), bisphenol A bis(diphenylphosphate), bisphenol F bis(diphenylphosphate), oligomeric alkylphosphate, oligomeric arylphosphate, and oligomeric alkylarylphosphate. Good results have been obtained with the use of organophosphate compounds selected from triphenyl phosphate, resorcinol bis(diphenylphosphate), tricresylphosphate, trixylylphosphate, and oligomeric arylphosphates.

Additional Components

The provided silicone compositions may optionally comprise additional components, provided that such components do not prevent the composition from curing. Examples of additional components may include, but are not limited to, hydrosilylation catalyst inhibitors, such as 3-methyl-3-penten-1-yne, 3,5-dimethyl-3-hexen-1-yne, 3,5-dimethyl-1-hexyn-3-ol, 1-ethynyl-1-cyclohexanol, 2-phenyl-3-butyn-2-ol, vinylcyclosiloxanes, and triphenylphosphine; adhesion promoters, such as the adhesion promoters taught in U.S. Pat. Nos. 4,087,585 and 5,194,649, the descriptions of which are hereby incorporated by reference; dyes; pigments; anti-oxidants; heat stabilizers; UV stabilizers; flame retardants; flow control additives; fillers, such as reinforcing fillers and extending fillers; and diluents, such as organic solvents and reactive diluents.

In some embodiments, the provided silicone compositions may optionally comprise a reactive diluent, such as an organosiloxane having formula (V):

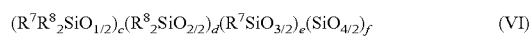

$$(R^7R^8{}_2SiO_{1/2})_c(R^8{}_2SiO_{2/2})_d(R^7SiO_{3/2})_e(SiO_{4/2})_f \qquad (VI)$$

wherein each $R^7$ is free from aliphatic unsaturation and is independently selected from $C_1$ to $C_{10}$ hydrocarbyl or halogen-substituted derivates thereof; each $R^8$ is independently selected from $R^7$ or an alkenyl group; and wherein c, d, e, and f are mole fractions and c=0-0.8, d=0-1, e=0-0.25, f=0-0.2, c+d+e+f=1, and c+d is not equal to 0, provided that when e+f=0, d is not equal to 0; wherein when $R^7$ is an alkenyl group, at least one carbon-carbon double bond is not terminal; and wherein the organosiloxane is linear, branched, or cyclic in structure.

A reactive diluent can be a single organosiloxane or a mixture comprising two or more different organosiloxanes. The viscosity of a reactive diluent at 25° C. is typically not greater than 20%, alternatively not greater than 10%, alternatively not greater than 1%, of the viscosity of Component (A) in the silicone composition. If a reactive diluent is used in the provided silicone composition, its concentration may be from about 1 to 20% (w/w), based on the combined weight of components (A) and (B).

In some embodiments, the provided silicone compositions may optionally comprise at least one ceramic filler. Examples of ceramic fillers include, but are not limited to, nitrides, carbides, metal oxides, and silicates. Suitable fillers may include, but are not limited to, silicon nitride; boron nitride; aluminum nitride; titanium nitride; zirconium nitride; silicon carbide; boron carbide; tungsten carbide; titanium carbide; zirconium carbide; molybdenum carbide; oxides of aluminum; oxides of magnesium; oxides of zinc; oxides of beryllium; oxides of zirconium; oxides of titanium; oxides of thorium; silicates of aluminum; silicates of magnesium; silicates of zirconium; silicates of titanium; and magnesium aluminum silicates.

In some embodiments, the provided silicone compositions may optionally comprise one or more organic solvents. The organic solvent can be any aprotic or dipolar aprotic organic solvent that it is at least partially miscible with and does not react with Component (A), Component (B), or the cured silicone composition. Examples of suitable organic solvents may included, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene.

Silicone Adhesives

In various embodiments, provided are silicone adhesives comprising one or more cured products of the provided silicone compositions. The presence of the hydrosilylation catalyst promotes cure (i.e. cross-linking) of the organosilicon compound and the silicone resin through addition reactions. In some embodiments, curing may be promoted by exposing the silicone composition to a temperature of from room temperature (approximately 23±2° C.) to 250° C. at atmospheric pressure. For example, cure of the provided silicone compositions may be achieved at temperatures of from about 20-50° C., 50-100° C., 100-150° C., 150-200° C., 200-250° C., and combinations thereof. The specific temperature used is dependent upon, among other things, the nature of the hydrosilylation catalyst, the nature of the organophosphate compound, and the desired cured product. Whether at or above room temperature, addition reactions are allowed to continue for a length of time sufficient to cure the organosilicon compound with the silicone resin to a desired degree. For example, the composition may be heated at a temperature of from 100 to 200° C. for a time of from about 0.1-0.3 h, 0.3-0.6 h, 0.6-0.9 h, 0.9-1.2 h, 1.2-1.5 h, 1.5-1.8 h, 1.8-2.1 h, 2.1-2.4 h, 2.4-2.7 h, 2.7-3.0 h, and combinations thereof.

The silicone adhesives formed by curing the provided silicone compositions have improved properties over those of known silicone adhesives. For example, as compared to known low flammability silicone adhesives, the provided adhesives are generally more mechanically flexible while maintaining the low flammability typical of many highly cross-linked silicone resins. As another example, the provided adhesives typically exhibit a transparency that is comparable to or greater than that of known adhesives, the degree of transparency dependent upon a number of factors, such as the composition, thickness, and refractive index of the adhesive. As a further example, the provided adhesives typically adhere in a manner comparable to known silicone adhesives comprising alkenyl-containing silicone resins, wherein they are able to maintain or retain adhesion to bonded substrates when such substrates are exposed to high temperature (such as from an open flame).

Reinforced Silicone Resin Film

In various embodiments, provided are reinforced silicone resin films, comprising one or more cured products of the provided silicone compositions. Reinforced silicone resin films may be prepared by techniques generally known in the art, wherein such techniques generally involve impregnating a fiber reinforcement into a curable silicone composition, and heating the impregnated fiber reinforcement to cure the silicone composition or allowing the composition to cure by other means. In some embodiments, the provided reinforced silicone resin films prepared comprise from 10 to 99% (w/w) of the cured silicone compositions disclosed herein. In some embodiments, the prepared films have a thickness of from about 5 to 500 µm. For example, the film may have a thickness of from about 5-25 µm, 25-50 µm, 50-75 µm, 75-100 µm, 100-125 µm, 125-150 µm, 150-175 µm, 175-200 µm, 200-225 µm, 225-250 µm, 250-275 µm, 275-300 µm, 300-325 µm, 325-350 µm, 350-375 µm, 375-400 µm, 400-425 µm, 425-450 µm, 450-475 µm, 475-500 µm, and combinations thereof. In some embodiments, the provided reinforced silicone resin films are freestanding films.

The fiber reinforcement used can be any reinforcement comprising fibers, including but not limited to, woven or nonwoven fabric, a mat or roving, or loose fibers. In some embodiments, the reinforcement has one or both of high Young's modulus and high tensile strength. For example, a suitable fiber reinforcement may have a Young's modulus at 25° C. of from about 3 to 1,000 GPa; alternatively, from about 3 to 200 GPa; alternatively, from about 10 to 100 GPa. As an additional example, a suitable fiber reinforcement may have a tensile strength at 25° C. of from about 50 to 10,000 MPa; alternatively, from about 50 to 1,000 MPa; alternatively, from about 50 to 500 MPa. Fibers used in the reinforcement may be any suitable shape, such as a cylindrical shape, and have any suitable diameter, such as from 1 to 100 µm. For example, cylindrical fibers having a diameter of from 1 to 20 µm; alternatively from 1 to 10 µm may be suitable. Loose fibers may be continuous, meaning the fibers extend throughout the reinforced silicone resin film in a generally unbroken manner, or chopped. Examples of suitable fiber reinforcements include, but are not limited to, reinforcements comprising glass fibers, quartz fibers, graphite fibers, nylon fibers, polyester fibers, aramid fibers (eg., Kevlar® and Nomex®), polyethylene fibers, polypropylene fibers, and silicon carbide fibers.

A fiber reinforcement may be heat-treated prior to use to remove organic contaminants. For example, the fiber reinforcement may be heated at a temperature of from 250° C. to 800° C. at atmospheric pressure; alternatively, from 400 to 700° C.; alternatively, from 550 to 650° C. In some embodiments, the reinforcement may be heated for a length of time sufficient to remove surface finish. For example, the fiber reinforcement may be heated at a temperature of from 250 to 800° C. for a time of from 0.1 to 3 h. Alternatively, the fiber reinforcement can be heated in air at a temperature of from 250 to 800° C. for a time of from 0.1 to 0.2 h.

Impregnating the fiber reinforcement in a provided curable silicone composition can be achieved using a variety of methods. For example, according to a first method, the fiber reinforcement can be impregnated by (i) applying a provided curable silicone composition to a release liner to form a silicone film; (ii) embedding a fiber reinforcement in the film; (iii) degassing the embedded fiber reinforcement; and (iv) applying the silicone composition to the degassed embedded fiber reinforcement to form an impregnated fiber reinforcement.

In step (i) of the aforementioned method, the curable silicone composition is applied to a release liner to form a silicone film in an amount sufficient to embed the fiber reinforcement using any suitable coating technique, such as spin coating, dipping, spraying, brushing, or screen-printing. The release liner can be any rigid or flexible material having a surface from which the reinforced silicone resin film can be removed without damage by delamination after the silicone resin is cured. Examples of release liners include, but are not limited to, Nylon, polyethyleneterephthalate, and polyimide.

In step (ii) of the aforementioned method, a fiber reinforcement is embedded in the silicone film. The fiber reinforcement can be embedded in the silicone film by simply placing the reinforcement on the film and allowing the silicone composition of the film to saturate the reinforcement. When the fiber reinforcement is a woven or nonwoven fabric, the reinforcement can be embedded by passing it through the composition, such as at a rate of from 1 to 1,000 cm/s at room temperature (~23±2° C.).

In step (iii) of the aforementioned method, the embedded fiber reinforcement is degassed. Degassing may be achieved by subjecting the embedded fiber reinforcement to a vacuum at a temperature of from room temperature to 60° C., for a period of time sufficient to remove entrapped air in the embedded reinforcement. For example, the embedded fiber reinforcement may be degassed by subjecting it to a pressure of from 1,000 to 20,000 Pa for 5 to 60 min. at room temperature.

In step (iv) of the aforementioned method, the silicone composition is applied to the degassed embedded fiber reinforcement to form an impregnated fiber reinforcement using any suitable coating technique, such as spin coating, dipping, spraying, brushing, or screen-printing.

The impregnated fiber reinforcement is then cured to form a reinforced silicone resin film. For example, the impregnated fiber reinforcement may be heated at a temperature of from room temperature to 250° C. at atmospheric pressure; alternatively, from room temperature to 200° C.; alternatively, from room temperature to 150° C. In some embodiments, the reinforcement may be heated for a length of time sufficient to cure (cross-link) the silicone resin. For example, the impregnated fiber reinforcement may be heated at a temperature of from 150 to 200° C. for a time of from 0.1 to 3 h. Alternatively, the impregnated fiber reinforcement can be heated in a vacuum at a temperature of from 100 to 200° C. and a pressure of from 1,000 to 20,000 Pa for a time of from 0.5 to 3 h.

The aforementioned method can further comprise the steps of (v) degassing the impregnated fiber reinforcement; (vi) applying a second release liner to the degassed impregnated fiber reinforcement to form an assembly; and (vii) compressing the assembly using conventional equipment such as a stainless steel roller, hydraulic press, rubber roller, or laminating roll set to remove excess silicone composition and/or entrapped air, and to reduce the thickness of the impregnated fiber reinforcement. For example, the assembly may be compressed at a pressure of from 1,000 Pa to 10 MPa and at a temperature of from room temperature (~23±2° C.) to 50° C.

Another example of a method for impregnating a fiber reinforcement in a provided curable silicone composition comprises (i) depositing a fiber reinforcement on a release liner; (ii) embedding the fiber reinforcement in a provided hydrosilylation-curable silicone composition; (iii) degassing the embedded fiber reinforcement; (iv) applying the silicone composition to the degassed embedded fiber reinforcement to form an impregnated fiber reinforcement; (v) optionally, degassing the impregnated fiber reinforcement; (vi) optionally, applying a second release liner to the degassed impregnated fiber reinforcement to form an assembly; and (vii) optionally, compressing the assembly.

A provided reinforced silicone resin film may comprise from 10 to 99% (w/w); alternatively from 30 to 95% (w/w); alternatively from 60 to 95% (w/w); alternatively from 80 to 95% (w/w); of a cured silicone composition provided herein. Also, the reinforced silicone resin film may have a thickness of from 15 to 500 μm; alternatively from 15 to 300 μm; alternatively from 20 to 150 μm; alternatively from 30 to 125 μm. Moreover, the reinforced silicone resin film may have a flexibility such that the film can be bent over a cylindrical steel mandrel having a diameter less than or equal to 3.2 mm without cracking, where the flexibility is determined as described in ASTM Standard D522-93a, Method B.

The provided reinforced silicone resin film may have a low coefficient of linear thermal expansion (CTE), high tensile strength, high modulus, or combinations thereof, as compared to an un-reinforced silicone resin film prepared from the same silicone composition. Also, although a reinforced and un-reinforced silicone resin film may have comparable glass transition temperatures, the reinforced film exhibits a much smaller change in modulus in the temperature range corresponding to the glass transition. For example the film may have a CTE (at temperature of from room temperature to 200° C.) of from 0 to 80 μm/m° C.; alternatively from 0 to 20 μm/m° C.; alternatively from 2 to 10 μm/m° C. Additionally, the film may have a tensile strength at 25° C. of from 50 to 200 MPa; alternatively from 80 to 200 MPa; alternatively from 100 to 200 MPa. Further, a reinforced silicone resin film may have a Young's modulus at 25° C. of from 2 to 10 GPa; alternatively from 2 to 6 GPa; alternatively from 3 to 5 GPa.

In some embodiments, the reinforced silicone resin film has low haze and a high degree of transparency, wherein degree depends on a number of factors, such as the composition of the cured silicone resin, the thickness of the film, and the refractive index of the fiber reinforcement. A provided reinforced silicone resin film may, for example, have a transparency (% transmittance) of at least 50%; alternatively at least 60%; alternatively at least 75%; alternatively at least 85%; in the visible region of the electromagnetic spectrum.

The provided reinforced silicone resin films may be useful in applications requiring films having high thermal stability, flexibility, mechanical strength, and transparency. The reinforced silicone resin films may also be a suitable for use in preparing a laminated substrate.

Laminated Substrate

In various embodiments, provided are laminated substrates comprising (A) a first substrate comprising at least one coatable surface; (B) at least one additional substrate overlying the first substrate, the additional substrate comprising at least one coatable surface; and (C) a silicone adhesive coating at least a portion of at least one coatable surface of each substrate; wherein at least one of the substrates is a provided reinforced silicone resin film; wherein at least a portion of the adhesive coating is between and in direct contact with opposing surfaces of adjacent substrates; and wherein the adhesive coating comprises a cured product of a silicone composition comprising: (A) a hydrosilylation-curable silicone composition comprising: (i) at least one silicone resin having an average of at least two silicon-bonded alkenyl groups, and at least one hydrocarbyl group per molecule; (ii) at least one organosilicon compound having an average of at least two silicon-bonded hydrogen atoms per molecule in an amount sufficient to cure the silicone resin of component (i); and (iii) a hydrosilylation catalyst; and (B) an organophosphate compound selected from (i) an organophosphate having formula (I); (ii) an organophosphate having formula (II); and (iii) a combinations thereof; wherein at least 50 mol % of the organic groups in the organophosphate compound are the same as the silicon-bonded hydrocarbyl groups in the silicone resin of Component (A). In some embodiments, the silicone composition comprises from about 15-99.9% (w/w) of Component (A) and from about 1-20% (w/w) of Component (B). For example, the composition may comprise from about 15-30% (w/w), 30-45% (w/w), 45-60% (w/w), 60-75% (w/w), 75-90% (w/w), 90-99.9% (w/w) of Component (A).

For example, the composition may comprise from about 1-5% (w/w), 5-10% (w/w), 10-15% (w/w), 15-20% (w/w) of Component (B).

A substrate can be any rigid or flexible material having a planar, complex, or irregular contour. A substrate can be transparent or nontransparent to light in the visible region of the electromagnetic spectrum. Also, a substrate can be an electrical conductor, semiconductor, or nonconductor. Examples of substrates include, but are not limited to, silicon, silicon having a surface layer of silicon dioxide, silicon carbide, indium phosphide, gallium arsenide; quartz; fused quartz; aluminum oxide; ceramics; glass; soda-lime glass; borosilicate glass; lead-alkali glass; borate glass; silica glass; alumino-silicate glass; lead-borate glass; sodium borosilicate glass; lithium aluminosilicate glass; Chalcogenide glass; phosphate glass; alkali-barium silicate glass; metal foils; polyolefins; polyethylene; polypropylene; polystyrene; polyethylene terephthalate (PET); polyethylene naphthalate; fluorocarbon polymers; polytetrafluoroethylene; polyvinylfluoride; polyamides; Nylon; polyimides; polyesters; poly(methyl methacrylate); epoxy resins; polyethers; polycarbonates; polysulfones; and polyether sulfones. A substrate can also be a reinforced silicone resin film, such as the films provided herein.

In some embodiments, a laminated substrate may contain from 2 to 20 substrates, each having at least one coatable surface that is at least partially coated with a provided silicone adhesive. Coating may be achieved using any suitable coating technique, such as spin coating, dipping, spraying, brushing, or screen-printing. In some embodiments, one or more of said coatable surfaces is fully coated with a provided silicone adhesive. For example, a laminated substrate comprising a provided freestanding silicone resin film may have a silicone adhesive coating on one side, on both sides, or on both sides and the edges, of each freestanding film. Each substrate in a laminated substrate may be the same or different. For example, a laminated substrate may comprise at least one glass substrate comprising at least one surface that is at least partially coated with a provided silicone adhesive, and at least one freestanding reinforced silicone resin substrate comprising at least one surface that is at least partially coated with a provided silicone adhesive.

A provided laminated substrate may be prepared by (i) applying a provided silicone composition on at least a portion of a first coatable surface of a first substrate to form a first film; (ii) overlaying a second substrate onto the first film; and (iii) curing the first film to form a first silicone adhesive coating. Steps corresponding to any of steps (i)-(iii) may be performed for the second and each additional substrate added. Each silicone composition applied to a substrate may be the same or different from a silicone composition applied to a different substrate. A provided laminated substrate may also be prepared by (i) applying a provided silicone composition on at least a portion of a first coatable surface of a first substrate to form a first film; (ii) at least partially curing the first film to form a first silicone adhesive coating; (iii) applying a different silicone composition on at least a portion of the first silicone adhesive coating to form a second film; (iv) overlaying a second substrate onto the second film; and (v) curing the second film to form a multilayer silicone adhesive coating. Steps corresponding to any of steps (i)-(v) may be performed for the second and each additional substrate added. Moreover, steps corresponding to (ii)-(iii) may be repeated to form a multilayer coating having more than 2 layers.

Single layer silicone adhesive coatings may have a thickness of from 0.03 to 300 µm; alternatively, from 0.1 to 100 µm; alternatively, from 0.1 to 50 µm. Multiple layer silicone adhesive coatings may have a thickness of from 0.06 to 300 µm; alternatively, from 0.2 to 100 µm; alternatively, 0.2 to 50 µm.

The provided laminated substrates comprise a provided silicone adhesive coating. In some embodiments, the provided laminated substrates may also comprise other suitable silicone adhesive coatings. Examples of other suitable silicone adhesive coatings include, but are not limited to, those described in WO/2009/111190, WO/2009/111193, WO/2009/111196, and WO/2009/111199. For example, the laminated substrates may comprise only the provided silicone adhesive coatings; distinct single layer coatings of the provided silicone adhesive and a different silicone adhesive; or a multiple layer coating comprising at least one layer of a provided silicone adhesive and at least one layer of a different silicone adhesive.

EXAMPLES

The present invention will be better understood by reference to the following examples which are offered by way of illustration and which one of skill in the art will recognize are not meant to be limiting.

Example 1

Silicone composition samples were prepared by mixing, in order, (i) a silicone resin [Dow Corning Silicone resin H, a polymer with an average composition of $(VMe_2SiO_{1/2})_{0.235}(Ph(OH)SiO_{2/2})_{0.036}(PhSiO_{3/2})_{0.729}$, as a 71.6 wt. % solution in toluene]; (ii) a crosslinker [Dow Corning Crosslinker I, phenyltris(dimethylsiloxy)silane]; (iii) an organophosphate compound [Suprestra Fyroflex RDP, resorcinol bis(diphenylphosphate)]; (iv) a catalyst [Dow Corning Catalyst K, platinum complexed with divinyltetramethyldisiloxane and inhibited with triphenylphosphine (TPP)]; and (v) a solvent (toluene). Each mixture was homogenized in a Hauschild mixer at 2400 rpm for 1 minute, and the mixed solution divided into two portions. One portion was cast into an aluminum dish and cured in an air circulating oven with a curing temperature sequence of: 2° C./min from room temperature to 100° C., 100° C./1 h, 2° C./min from 100° C. to 150° C., and 150° C./1 h, then the oven was switched off to cool to obtain a cured slab. The other portion of the solution was poured into a saturation trough, and a Style 106 glass fabric (BGF Industries) was passed though the solution under a metal bar to saturate the fabric with resin solution. The saturated/impregnated fabric was hung vertically in a fume hood over night to fry off the solvent. The dried resin-impregnated fabric was then transferred to an air circulating oven to cure in the same way as for the cured resin slab. The cured slabs and films were used to measure mechanical elongation before break, for observing whether the slab was optically transparent, and to measure haze.

The sample compositions, and observations of slab transparency properties and the haze value of the reinforced films (measured by a Gardner Haze meter) are shown in Table 1. The haze values, plotted as a function of the amount of organophosphate in the composition, are also shown in FIG. 1.

TABLE 1

Formulations of some miscible silicone resin-phosphate plasticizers and haze value of reinforced film.

| Sample | Resin (g) | Crosslinker (g) | Organo-phosphate (g) | Catalyst (g) | Solvent (g) | Solid Content (%) | Transparency Observations Dry, cured slab | Haze of reinforced film (%) |
|---|---|---|---|---|---|---|---|---|
| A | 10 | 1.238 | 0.000 |  | 1.6 | 55.57 | Transparent | 9.19 |
| B | 10 | 1.238 | 0.168 | 0.046 | 1.4 | 55.71 | Transparent | 4.70 |
| C | 10 | 1.238 | 0.336 | 0.046 | 1.2 | 55.85 | Transparent | 3.43 |
| D | 10 | 1.238 | 0.504 | 0.046 | 1 | 55.99 | Transparent | 1.51 |
| E | 10 | 1.238 | 0.672 | 0.046 | 0.9 | 55.70 | Transparent | 1.79 |
| F | 10 | 1.238 | 0.840 | 0.046 | 0.8 | 55.40 | Transparent | 3.01 |
| G | 10 | 1.238 | 1.008 | 0.046 | 0.6 | 55.54 | Transparent | 5.74 |
| H | 10 | 1.238 | 1.176 | 0.046 | 0.4 | 55.68 | Transparent | 5.78 |

As seen in all these compositions, the organophosphate was compatible with the highly crosslinked silicone resin and formed an optically transparent slab. The incorporation of the organophosphate also allowed for a haze value of lower than 2% when a glass fiber reinforced film was made with the appropriate amount of the organophosphate.

Example 2

Silicone composition samples, as shown in Table 2, were prepared by mixing, in order, (i) a silicone resin [Dow Corning Silicone resin H, a polymer with an average composition of $(VMe_2SiO_{1/2})_{0.235}(Ph(OH)SiO_{2/2})_{0.036}(PhSiO_{3/2})_{0.729}$, as a 71.6 wt. % solution in toluene]; (ii) a crosslinker [Dow Corning Crosslinker I, phenyltris(dimethylsiloxy)silane]; (iii) an organophosphate compound [Suprestra Fyroflex RDP, resorcinol bis(diphenylphosphate)]; and (iv) a catalyst (Dow Corning Catalyst J, platinum complexed with divinyltetramethyldisiloxane). Additionally, a separate composition was made without the catalyst. Each mixture was homogenized in a Hauschild mixer at 2400 rpm for 1 minute, and the mixed solutions divided into two portions. Cured slabs were prepared as described in Example 1.

TABLE 2

Formulations for casting for mechanical testing

| Sample | Resin (g) | Crosslinker (g) | Organo-phosphate (g) | Catalyst (g) |
|---|---|---|---|---|
| A | 40 | 4.950 | 0.000 | 0.184 |
| B | 40 | 4.950 | 1.680 | 0.184 |

Figure 2:
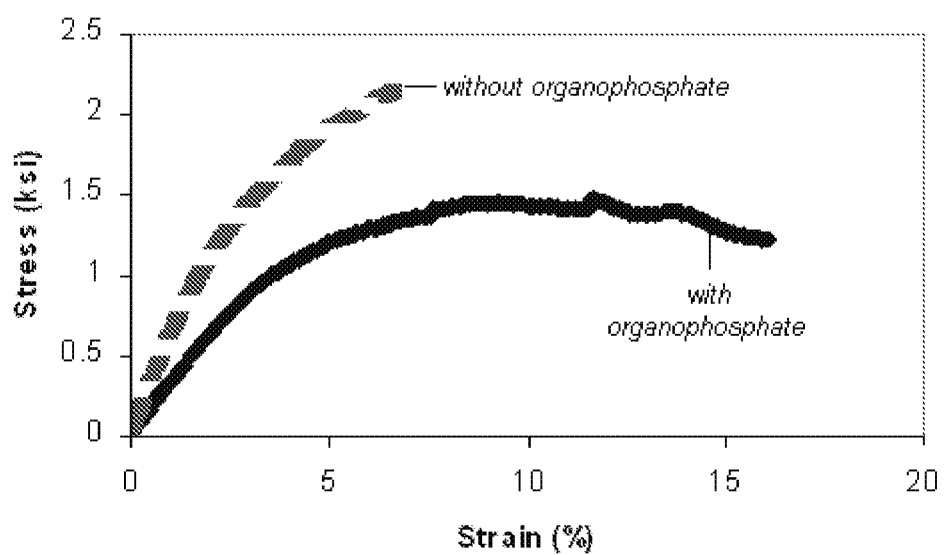
FIG. 2 depicts stress-strain curves of the plasticized (solid) and unplasticized (dashed) silicone resins of Example 2, illustrating that incorporation of 5 wt % of an organophosphate significantly increased the strain to break value.

The cured slabs prepared were tested in a tension mode on a MTS testing frame with a load cell and an extensometer at a displacement speed of 2 mm/min. The load-displacement curves were plotted in FIG. 2. As can be seen from the plot, the incorporation of a small amount of organophosphate into the highly brittle, highly crosslinked silicone resin, significant improves elongation at break and mechanical flexibility.

Example 3

Silicone composition samples (as described in Table 3) were prepared by mixing, in order, (i) a silicone resin [Dow Corning Silicone resin H, a polymer with an average composition of $(VMe_2SiO_{1/2})_{0.235}(Ph(OH)SiO_{2/2})_{0.036}(PhSiO_{3/2})_{0.729}$, as a 71.6 wt. % solution in toluene]; (ii) a crosslinker [Dow Corning Crosslinker I, phenyltris(dimethylsiloxy)silane]; (iii) various organophosphate compounds [A: Triphenylphosphate (Sigma Aldrich); B: Suprestra Syn-O-AD 8484, Tricresyl phosphate; C: Suprestra Fyroflex RDP, resorcinol bis(diphenylphosphate); D: Suprestra Fyroflex BDP, bisphenol A bis(diphenyl phosphate); E: Suprestra Fyrquel L, trixylyl phosphate ester; F: Suprestra Fyrol A710, Aryl phosphate blend; G: Fyrol PNX, oligomeric alkyl phosphate]; (iv) a catalyst [Dow Corning Catalyst J, platinum complexed with divinyltetramethyldisiloxane; or Dow Corning Catalyst K, platinum complexed with divinyltetramethyldisiloxane and inhibited with triphenylphosphine (TPP)]; and (v) a solvent (toluene). Each mixture was homogenized in a Hauschild mixer at 2400 rpm for 1 minute, and the mixed solutions divided into two portions. Cured slabs were prepared as described in Example 1. The optical transparency was also examined and recorded in Table 3. The compositions range from silicone resin with various organophosphates and at different loading levels.

It was observed that when a significant portion of the hydrocarbyl groups on the silicone resin were the same or similar to those on the organophosphate, cured transparent slabs were obtained. However when organophosphate G, an oligomeric alkylphosphate, was used, only opaque compositions were obtained. Thus, not all organophosphates are suitable for a specific silicone resin if optical transparency is a requirement for the use of the silicone resin.

TABLE 3

Formulations of plasticized silicones resins and cured resin appearance

| Sample | Resin (g) | Crosslinker (g) | Organo-phosphate (g) | Catalyst J (g) | Catalyst K (g) | Solvent (g) | Solid Content (%) | Transparency Observations Dry, cured slab |
|---|---|---|---|---|---|---|---|---|
| A | 22 | 3.207 | None |  | 0.103 | 6.2 | 55.57 | Transparent |
| B | 15 | 2.186 | A: 0.706 | 0.071 |  | 3.5 | 55.562 | Transparent |
| C | 15 | 2.186 | B: 0.706 | 0.071 |  | 3.5 | 55.562 | Transparent |

TABLE 3-continued

Formulations of plasticized silicones resins and cured resin appearance

| Sample | Resin (g) | Crosslinker (g) | Organo-phosphate (g) | Catalyst J (g) | Catalyst K (g) | Solvent (g) | Solid Content (%) | Transparency Observations Dry, cured slab |
|---|---|---|---|---|---|---|---|---|
| D | 15 | 2.186 | C: 0.706 | 0.071 | | 3.5 | 55.562 | Transparent |
| E | 15 | 2.186 | D: 0.706 | 0.071 | | 3.5 | 55.562 | Transparent |
| F | 15 | 2.186 | E: 0.706 | 0.071 | | 3.5 | 55.562 | Transparent |
| G | 22 | 3.488 | A: 1.049 | 0.105 | | 5.1 | 55.101 | Transparent |
| H | 22 | 3.488 | B: 1.144 | 0.105 | | 5.6 | 55.043 | Transparent |
| I | 22 | 3.488 | C: 1.144 | 0.105 | | 5.6 | 55.043 | Transparent |
| J | 22 | 3.488 | D: 1.144 | 0.105 | | 5.6 | 55.043 | Transparent |
| K | 22 | 3.488 | E: 1.144 | 0.105 | | 5.6 | 55.043 | Transparent |
| L | 22 | 3.488 | A: 2.098 | 0.105 | | 4.1 | 55.016 | Transparent |
| M | 22 | 3.488 | B: 2.098 | 0.105 | | 4.1 | 55.016 | Transparent |
| N | 22 | 3.488 | C: 2.098 | 0.105 | | 4.1 | 55.016 | Transparent |
| O | 22 | 3.488 | D: 2.098 | 0.105 | | 4.1 | 55.016 | Transparent |
| P | 22 | 3.488 | E: 2.098 | 0.105 | | 4.1 | 55.016 | Transparent |
| Q | 15 | 2.186 | G: 0.706 | 0.071 | | 3.5 | 55.562 | White Opaque |
| R | 22 | 3.488 | G: 1.144 | 0.105 | | 5.6 | 55.043 | White Opaque |
| S | 22 | 3.488 | G: 2.098 | 0.105 | | 4.1 | 55.016 | White Opaque |
| T | 26 | 3.218 | F: 1.092 | 0.119 | | 3.4 | 55.030 | Transparent |
| U | 26 | 3.218 | F: 2.183 | 0.119 | | 3.4 | 53.309 | Transparent |

Example 4

Silicone composition samples (as described in Table 4) were prepared by mixing, in order, (i) a silicone resin [Dow Corning Silicone resin H, a polymer with an average composition of $(VMe_2SiO_{1/2})_{0.235}(Ph(OH)SiO_{2/2})_{0.036}(PhSiO_{3/2})_{0.729}$, as a 71.6 wt. % solution in toluene]; (ii) a crosslinker [Dow Corning Crosslinker I, phenyltris(dimethylsiloxy)silane]; (iii) an organophosphate compound [Suprestra Fyroflex RDP, resorcinol bis(diphenylphosphate)]; and (iv) a catalyst [Dow Corning Catalyst J, platinum complexed with divinyltetramethyldisiloxane; or Dow Corning Catalyst K, platinum complexed with divinyltetramethyldisiloxane and inhibited with triphenylphosphine (TPP)]. Each mixture was homogenized in a Hauschild mixer at 2400 rpm for 1 minute, and the mixed solutions divided into two portions. Cured slabs were prepared as described in Example 1. The cured slabs of both compositions were extracted by hot toluene in a Soxhlet extractor for 48 hours. As seen in Table 5, the extra weight loss in the resin composition that contained the organophosphate (approximately 4%) was very close to the amount of organophosphate incorporated (5%). This example illustrates that in compositions such as these, the organophosphates are plasticizers physically mixed into the highly crosslinked silicone resins. The miscibility of the organophosphate into the resin was a result of the choice of hydrocarbyl groups on the silicone resin in relation to the organophosphate, or vise versa.

TABLE 4

Formulation of resins used for extraction.

| Sample | Resin (g) | Crosslinker (g) | Organo-phosphate (g) | Catalyst J (g) | Catalyst K (g) |
|---|---|---|---|---|---|
| A | 22 | 3.488 | None | 0.105 | |
| B | 24 | 3.805 | 1.144 | | 0.114 |

TABLE 5

Extraction weight loss of plasticized resin as compared with unplasticized one.

| Sample | Wt. Glass Cloth | Wt. Glass + copper wire | Wt., Glass + copper wire + sample | Total Wt. after extraction, g | Resin Wt. retention, % | Resin Wt. Loss, % |
|---|---|---|---|---|---|---|
| A | 0.3685 | 1.1928 | 1.4663 | 1.4622 | 97.69 | 2.31 |
| Ref. for A | 0.2157 | 0.8601 | — | 0.8617 | — | — |
| B | 0.2231 | 0.8591 | 1.3681 | 1.3385 | 93.79 | 6.21 |
| Ref. for B | 0.2401 | 0.8195 | — | 0.8214 | — | — |

The present invention should not be considered limited to the specific examples described herein, but rather should be understood to cover all aspects of the invention. Various modifications and equivalent processes, as well as numerous structures and devices, to which the present invention may be applicable will be readily apparent to those of skill in the art. Those skilled in the art will understand that various changes may be made without departing from the scope of the invention, which is not to be considered limited to what is described in the specification.

What is claimed is:

1. A silicone composition, comprising:
   (A) from 15 to 99.9% (w/w) of a hydrosilylation-curable silicone composition comprising:
      (i) at least one silicone resin having the formula (III):

$$(R^1R^2_2SiO_{1/2})_w(R^2_2SiO_{2/2})_x(R^1SiO_{3/2})_y(SiO_{4/2})_z \qquad (III)$$

wherein each $R^1$ is independently selected from $C_1$ to $C_{10}$ alkyl, $C_6$ to $C_{20}$ aryl, or halogen-substituted derivates thereof; each $R^2$ is independently selected from $R^1$ or an alkenyl group, provided that the resin has an average of at least two silicon-bonded alkenyl groups per molecule; and wherein w, x, y, and z are mole fractions with w=0 to 0.8, x=0 to 0.6, y=0 to 0.99, z=0 to 0.35; and wherein w+x+y+z=1, y+z/(w+x+y+z)=0.2 to 0.99, and w+x/(w+x+y+z)=0.01 to 0.8;

(ii) at least one organosilicon compound having an average of at least two silicon-bonded hydrogen atoms per molecule; and (iii) a catalytic amount of hydrosilyation catalyst; and (B) from 1 to 20% (w/w) of at least one organophosphate compound selected from:

(i) at least one organophosphate having the formula (I):

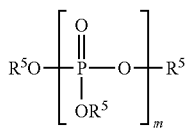   (I)

(ii) at least one organophosphate having the formula (II):

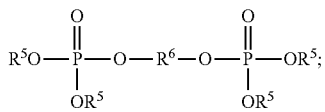   (II)

or (iii) combinations thereof;

wherein $R^5$ is $C_1$ to $C_{10}$ alkyl or $C_6$-$C_{20}$ aryl; $R^6$ is hydrocarbylene, and m has a value of from 1 to 20; and wherein at least 50 mol % of the silicon-bonded alkyl or aryl groups in the silicone resin of (A) are the same as the groups $R^5$ in the organophosphate compound of (B).

2. A silicone composition according to claim 1, wherein y+z/(w+x+y+z)=0.5 to 0.95.

3. A silicone composition according to claim 1, wherein w+x/(w+x+y+z)=0.05 to 0.5.

4. A silicone composition according to claim 1, comprising from 50 to 99% (w/w) of the hydrosilylation-curable silicone composition of (A).

5. A silicone composition according to claim 1, comprising from 2 to 15% (w/w) of the at least one organophosphate compound of (B).

6. A silicone composition according to claim 1, wherein at least 60 mol % of the alkyl or aryl groups in the silicone resin of (A) are the same as the groups $R^5$ in the organophosphate compound of (B).

7. A silicone composition according to claim 1, wherein the organosilicon compound of (A) is selected from the group consisting of $(Vi_2MeSiO_{1/2})_{0.25}(PhSiO_{3/2})_{0.75}$, $(ViMe_2SiO_{1/2})_{0.25}(PhSiO_{3/2})_{0.75}$, $(ViMe_2SiO_{1/2})_{0.25}(MeSiO_{3/2})_{0.25}(PhSiO_{3/2})_{0.50}$, $(ViMe_2SiO_{1/2})_{0.15}(PhSiO_{3/2})_{0.75}(SiO_{4/2})_{0.1}$, $(CH_2=CHCH_2(Me_2)Si)_{0.3}(Me_2SiO_{2/2})_{0.2}(MeSiO_{3/2})_{0.5}$, and $(Vi_2MeSiO_{1/2})_{0.15}(ViMe_2SiO_{1/2})_{0.1}(PhSiO_{3/2})_{0.75}$, where "Me" is methyl, "Vi" is vinyl, and "Ph" is phenyl.

8. A silicone composition according to claim 1, wherein the hydrosilylation catalyst comprises one or more of platinum, rhodium, ruthenium, palladium, osmium, and iridium.

9. A silicone adhesive, comprising at least one cured product of a silicone composition, comprising:

(A) from 15 to 99.9% (w/w) of a hydrosilylation-curable silicone composition comprising:

(i) at least one silicone resin having the formula (III):

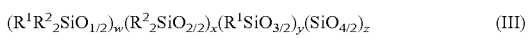   (III)

wherein each $R^1$ is independently selected from $C_1$ to $C_{10}$ alkyl, $C_6$ to $C_{20}$ aryl, or halogen-substituted derivate thereof; each $R^2$ is independently selected from $R^1$ or an alkenyl group, provided that the resin has an average of at least two silicon-bonded alkenyl groups per molecule; and wherein w, x, y, and z are mole fractions with w=0 to 0.8, x=0 to 0.6, y=0 to 0.99, z=0 to 0.35; and wherein w+x+y+z=1, y+z/(w+x+y+z)=0.2 to 0.99, and w+x/(w+x+y+z)=0.01 to 0.8;

at least one $C_1$ to $C_{10}$ alkyl, $C_6$-$C_{20}$ aryl, or halogen-substituted derivate thereof, said resin having an average of at least two silicon-bonded alkenyl groups per molecule;

(ii) at least one organsilicon compound having an average of at least two silicon-bonded hydrogen atoms per molecule; and (iii) a catalytic amount of a hydrosilylation catalyst; and (B) from 1 to 20% (w/w) of at least one organophosphate compound selected from:

(i) at least one organophosphate having the formula (I):

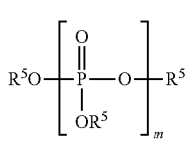   (I)

(ii) at least one organophosphate having the formula (II):

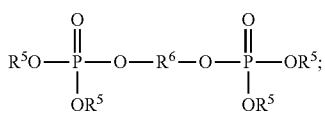   (II)

or (iii) combinations thereof;

wherein $R^5$ is $C_1$ to $C_{10}$ alkyl or $C_6$-$C_{20}$ is hydrocarbylene, and m has a value of from 1 to 20; and wherein at least 50 mol % of the alkyl or aryl groups in the silicone resin of (A) are the same as the groups $R^5$ in the organophosphate compound of (B).

10. A silicone adhesive according to claim 9 having a transparency of at least 60%.

11. A silicone adhesive according to claim 9 having a transparency of at least 75%.

12. A silicone resin film comprising at least one cured product of the silicone composition of claim 1.

13. The silicone resin film according to claim 12, wherein the film has a haze of less than 10%.

14. A reinforced silicone resin film according to claim 13, comprising a fiber reinforcement.

15. A reinforced silicone resin film according to claim 14, comprising a thickness of from 5 to 500 μm.

16. A laminated substrate, comprising:
(A) a first substrate having at least one coatable surface;
(B) at least one additional substrate overlying the first substrate, the at least one additional substrate comprising at least one coatable surface;
wherein at least one of the substrates of (A) and (B) is a reinforced silicone resin film according to claim 14; and
(C) a silicone adhesive coating at least a portion of at least one coatable surface of the first substrate and at least one coatable surface of the at least one additional substrate;
wherein at least a portion of the silicone adhesive coating is between and in direct contact with opposing surfaces of overlying substrates; and
wherein the silicone adhesive coating comprises at least one cured product of a silicone composition comprising:
(i) from 15 to 99.9% (w/w) of a hydrosilylation-curable silicone composition comprising:
(a) at least one silicone resin comprising at least one $C_1$ to $C_{10}$ alkyl, $C_6$-$C_{20}$ aryl, or halogen-substituted derivate thereof, said resin having an average of at least two silicon-bonded alkenyl groups per molecule;
(b) at least one organosilicon compound having an average of at least two silicon-bonded hydrogen atoms per molecule; and
(c) a catalytic amount of a hydrosilylation catalyst; and (ii) from 1 to 20% (w/w) of at least one organophosphate compound selected from:
(a) at least one organophosphate having the formula (I):

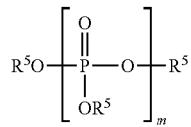

(b) at least one organophosphate having the formula (II):

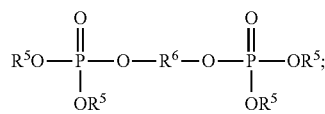

or
(c) combinations thereof;
wherein $R^5$ is $C_1$ to $C_{10}$ alkyl or $C_6$-$C_{20}$ aryl; $R^6$ is hydrocarbylene, and m has a value of from 1 to 20; and
wherein at least 50 mol % of the alkyl or aryl groups in the silicone resin of (i) are the same as the groups $R^5$ in the organophosphate compound of (ii).

17. A laminated substrate according to claim 16, wherein the silicone resin of (C) (i) (A) has formula (III):

$$(R^1R^2{}_2SiO_{1/2})_w(R^2{}_2SiO_{2/2})_x(R^1SiO_{3/2})_y(SiO_{4/2})_z \quad (III)$$

wherein each $R^1$ is independently selected from $C_1$ to $C_{10}$ alkyl, $C_6$ to $C_{20}$ aryl, or halogen-substituted derivate thereof; each $R^2$ is independently selected from $R^1$ or an alkenyl group, provided that the resin has an average of at least two silicon-bonded alkenyl groups per molecule; and wherein w, x, y, and z are mole fractions with w=0 to 0.8, x=0 to 0.6, y=0 to 0.99, z=0 to 0.35; and wherein w+x+y+z=1, y+z/(w+x+y+z)=0.2 to 0.99, and w+x/(w+x+y+z)=0.01 to 0.8.

18. A laminated substrate according to claim 17, wherein the silicone adhesive has a transparency of at least 60%.

* * * * *